UNITED STATES PATENT OFFICE.

MAX HAMBURG, OF BISHOP STORTFORD, ENGLAND.

DRY FAT AND OIL COMPOUNDS.

1,124,611.   Specification of Letters Patent.   Patented Jan. 12, 1915.

No Drawing.   Application filed December 13, 1913.   Serial No. 806,612.

*To all whom it may concern:*

Be it known that I, MAX HAMBURG, a subject of Austria-Hungary, residing at Bishop Stortford, Hertfordshire, in England, have invented Improvements in Dry Fat and Oil Compounds, of which the following is a specification.

The administration, and use in manufacture, of fats and fatty oils such as castor oil, cod-liver oil and the like or mineral fats or oils such as paraffin B. P. in combination with malt extract or malto-dextrin obtained from starch are frequently rendered very difficult or inconvenient by the fatty flavor and toughness of the compound. The efficiency of such compounds is also largely dependent on the state of division of the oil therein, as the full benefit can only be derived from the oil if the same is in a very finely divided state. It has been proposed to attain such compounds in a solid, pulverulent form by emulsifying oil with gum or adragant, and mixing the emulsion with the extract, the resulting mass being converted into a dry powder by being subjected to a low temperature *in vacuo*. This method is inconvenient, as it involves three distinct operations, viz. emulsifying the oil with the emulsifying agent and water, mixing the emulsion with malt extract, and drying the mixture. Moreover, the emulsifying agents are sometimes difficult to digest by the patient. The comparatively large amount of water required for producing the emulsion must be evaporated, which involves expense and also causes partial saponification and deterioration of the fat.

The object of the present invention is to obviate these drawbacks.

I have found that the oils and fats in question directly mixed, even in high proportion, with highly concentrated malt extract or malto-dextrin syrup, by suitable mechanical means such as an emulsifying machine running at high speed, are converted into an emulsion without any addition of emulsifying agents and water the resultant product, when dry, being a crisp mass which can easily be pulverized or granulated. The process of emulsifying in this manner is greatly accelerated if the malt extract or syrup is previously heated to about 40 or 50° C., but this heating is not absolutely essential. If solid fats or mineral solids such as cocoa fat or the higher paraffins are used, they must of course be liquefied by heat before mixing with the extract or syrup. For example, I emulsify 25 or more parts of castor-oil with 75 parts or less of highly concentrated malt extract, by treatment with a high-speed mechanical mixer, and then reduce the mixture to a dry form by the evaporation of the water preferably *in vacuo*. This drying may be done by spreading the mixture on heated plates in a vacuum chamber at 40 to 50° C. Instead of castor-oil cod-liver oil, paraffin oil B. P. or any other fat, mineral fat, or mineral oil may be used. By this means I obtain a compound which can be granulated, and contains under favorable conditions up to 25 or more per cent. of oil. Mixed with water, the powder produces at once a milky fluid not viscous, which proves that the oil remains in a very finely divided state.

What I claim as my invention and desire to secure by Letters Patent of the United States is:—

1. The process of producing matters having the physical properties of oils in solid form, and producing dry pulverizable compounds thereof with diastatic starch conversion products, which consists in directly mixing and emulsifying the said matters with highly concentrated diastatic starch conversion products, without addition of a foreign emulsifying agent, and drying the resulting emulsion.

2. The process consisting in directly emulsifying not less than 25 parts of matters having the physical properties of oil with approximately 75 parts of highly concentrated diastatic starch conversion products, without addition of a foreign emulsifying agent, and drying and granulating the resultant mixture.

3. A dry compound consisting of a water-free composition of 25 or more per cent. of matters having the physical properties of oil with 75 or less per cent. of highly concentrated diastatic starch conversion products, without addition of a foreign emulsifying agent.

In witness whereof I have signed this specification in the presence of two witnesses.

MAX HAMBURG.

Witnesses:
O. J. WORTH,
H. D. JAMESON.